E. C. SMITH.
HEN'S NEST.
APPLICATION FILED APR. 7, 1908.
917,174.
Patented Apr. 6, 1909.
2 SHEETS—SHEET 1.
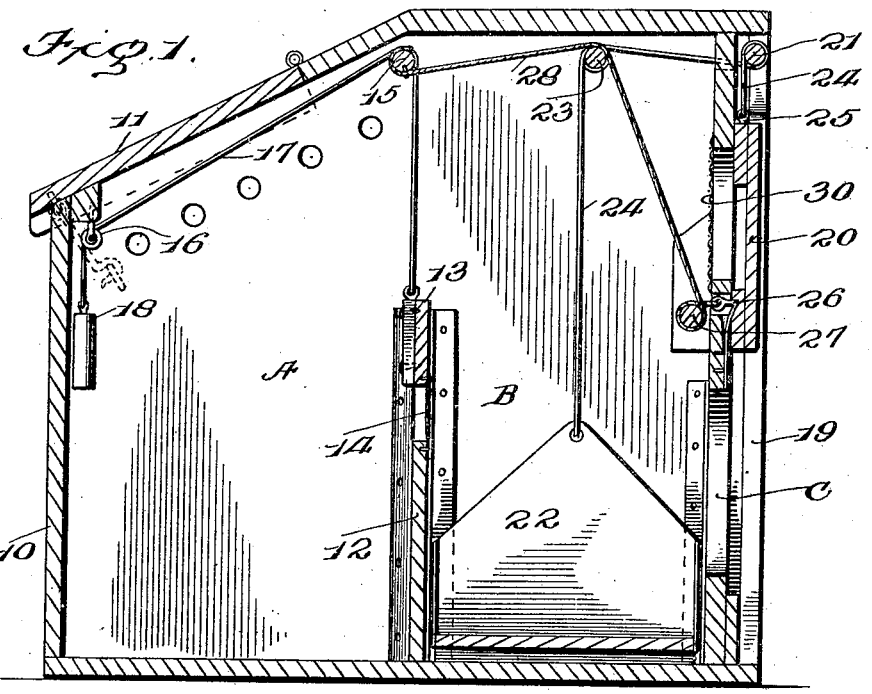
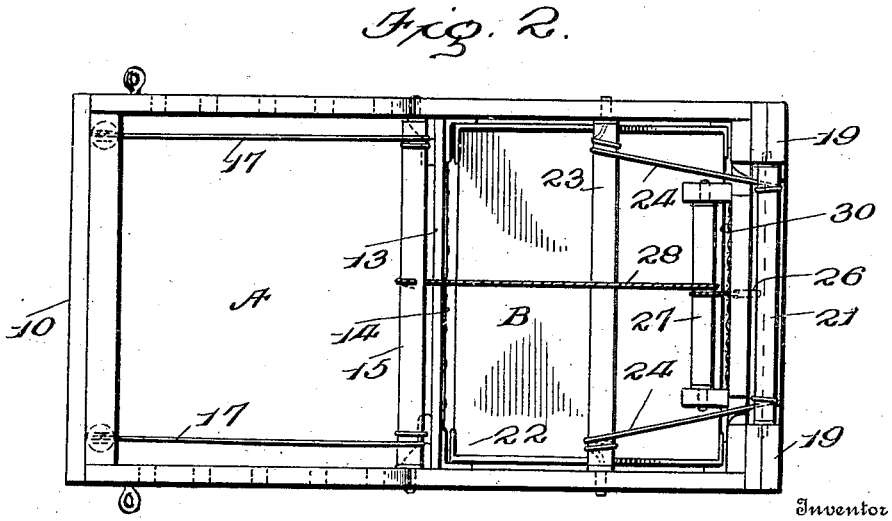
Witnesses
Inventor
E. C. Smith
By Attorneys E. C. SMITH.
HEN'S NEST.
APPLICATION FILED APR. 7, 1908.
917,174.
Patented Apr. 6, 1909.
2 SHEETS—SHEET 2.
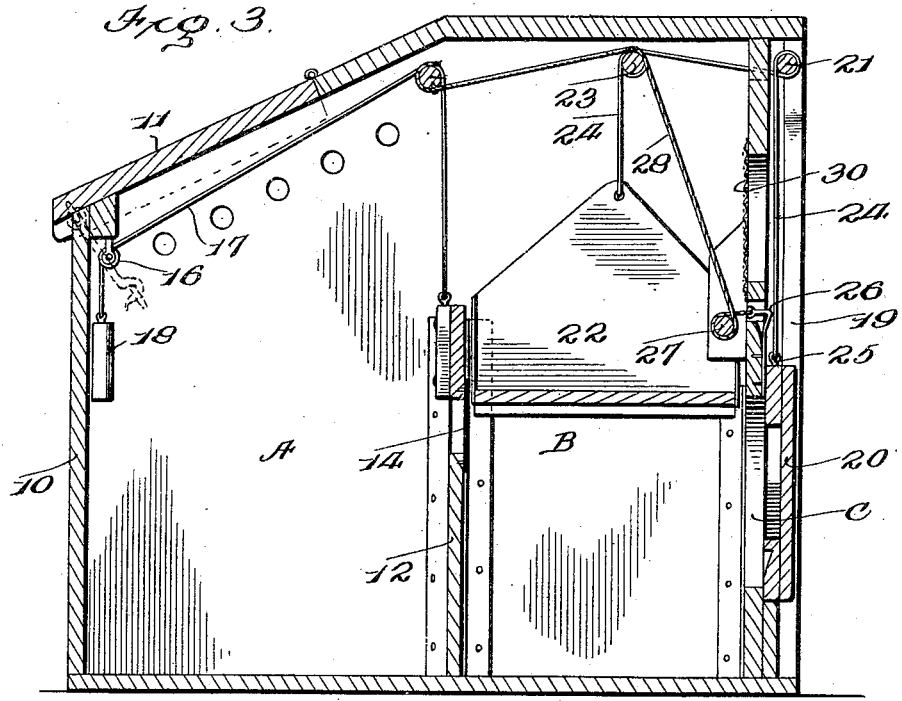
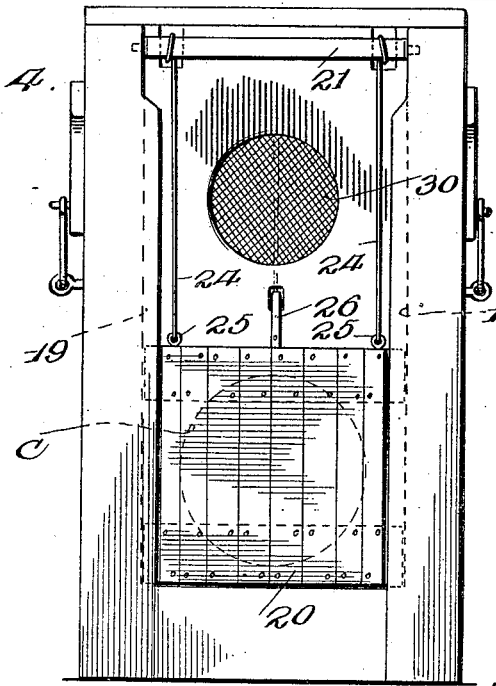
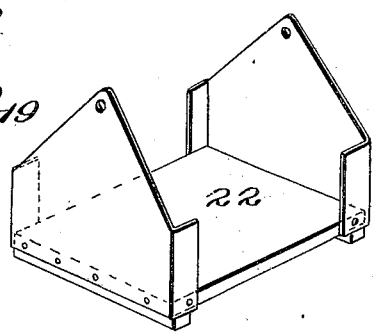
Inventor
E. C. Smith

UNITED STATES PATENT OFFICE.

EDWARD C. SMITH, OF MERKEL, TEXAS.

HEN'S NEST.

No. 917,174.   Specification of Letters Patent.   Patented April 6, 1909.

Application filed April 7, 1908. Serial No. 425,762.

*To all whom it may concern:*

Be it known that I, EDWARD C. SMITH, citizen of the United States, residing at Merkel, in the county of Taylor and State of Texas, have invented certain new and useful Improvements in Hens' Nests, of which the following is a specification.

This invention has for its object a simple, durable, and efficient construction of hen's nest, which will permit the hen to enter or leave the nest at will, and which will provide means whereby the hen, while on the nest, will be prevented from being bothered by another hen, the parts being so arranged that when the hen enters the nest she will close the door behind her and shut off any further ingress in the nest until the hen is ready to leave the same, whereupon the hen will open the door if she desires to leave the nest and the door will remain open until the nest is again occupied.

With these and other objects in view as will more fully appear as the description proceeds, the invention consists in certain constructions, arrangements and combinations of the parts that I shall hereinafter fully describe and then point out the novel features in the appended claims.

For a full understanding of the invention, reference is to be had to the following description and accompanying drawings, in which:

Figure 1 is a longitudinal sectional view of a hen's nest constructed in accordance with my invention, the entrance way into the nest being shown open; Fig. 2 is a top plan view of the nest, the lid or top of the nest being removed; Fig. 3 is a view similar to Fig. 1 except that the entrance way is shown closed; Fig. 4 is a front elevation of the nest; and, Fig. 5 is a detail perspective view of the elevator hereinafter specifically referred to.

Corresponding and like parts are referred to in the following description and indicated in all the views of the drawings by the same reference characters.

My improved hen's nest comprises a box 10 of any desired size, said box being divided by a transverse partition 12 into two compartments designated A and B, respectively, the upper edge of the partition terminating short of the top of the box so as to provide communication between the two compartments.

11 designates a hinged lid for the box, said lid being kept closed at all times, except when it is desired to rob the nesting compartment A of eggs, to place a setting hen in the nesting compartment, to replenish the nesting material therein, or to renovate the nest. Preferably the hinged lid is provided with a fastening device so that it may only be opened from the outside.

A transversely extending trap board 13 is mounted for a vertically sliding movement in suitable guides above and in vertical alinement with the partition 12, being preferably flexibly connected to the partition by means of a cloth 14 or the like. Cables (by which term it is to be understood that cords, ropes, chains, or other flexible connecting members are included) are connected to the trap board 13 at the ends thereof and pass upwardly over a roller 15 that extends transversely of the box 10 and that is journaled therein near the top of the box. The said cables 17 extend rearwardly from the roller 15 and thence downwardly over pulleys 16, the opposite ends of said cables having weights 18 connected thereto, so as to normally hold the trap board 13 at the upper limit of its vertical movement. Preferably the cables 17 are wound more than once around the roller 15 so as to prevent the slipping of the cables and insure that the roller shall be turned when the trap board 13 is lowered, for a purpose that will be hereinafter fully set forth.

At the front of the box 10, I provide vertical guideways 19 in which a shutter 20 is mounted for a vertical sliding movement, so as to open or close the entrance way C leading into the entrance compartment B of the nest. Cables 24 are connected at one end, as by screw eyes 25 or the like to the upper edge of the shutter 20 and pass upwardly and around a roller 21 journaled in the front of the box at the top thereof. The cables 24 also pass over another roller 23 which is located at the rear of the roller 21 in horizontal alinement therewith. The cables 24 thence extend downwardly and are secured at their other ends to side boards of an elevator 22 which is guided between the front end of the box and the partition 12 so as to have a vertical movement, the limits of such movement being preferably defined as in Figs. 1 and 3, the elevator being shown in lowered position in Fig. 1 and in a raised position in Fig. 3. It is to be understood that the shutter 20 normally over-balances the elevator 22. In order to hold the shutter 20 in raised position, when the elevator 22 is lowered, it being clearly understood that the elevator is lowered when the shutter is raised, and vice-versa, by arrangement of cables 24, I provide a latch 26 which is adapted to spring out into a keeper recess in the rear side of the shutter 20 and which is secured to a release cable 28 which passes around a roller 27 journaled in brackets on the inner side of the box front just above the entrance way C, said release cable 28 extending upwardly and thence rearwardly and being secured to the roller 15. Thus it will be understood that as the trap board 13 is depressed, the roller 15 will be turned in a direction to draw upon the release cable 28 and thereby release the latch 26 from engagement with the shutter 20.

30 designates a screened opening which is located in the front of the box above the shutter 20 when the latter is in lowered position, the said screened opening serving for the purpose of ventilation as well as for another purpose which will now be described with the practical operation of the nest.

When the nest is ready for occupancy, it will be understood that the parts are in the position illustrated in Fig. 1, the elevator 22 being lowered and the shutter being raised and held in such position by the latch 26. When a hen passes through the entrance way C on to the elevator 22, in the entrance compartment B, she will naturally in search of a dark or secluded place to lay, wish to see what is behind the partition, and she will thus hop upon the trap board 13 and her weight will manifestly depress the trap board which will effect the partial rotation of the roller 15 and the release of the latch 26 from the shutter 20, the weight of the latter then causing the shutter to lower and the elevator 22 to be raised, the parts being then in the position illustrated in Fig. 3. The hen will naturally jump from the perch board down into the nesting compartment A and any further ingress into the nest will be effectually shut off by the shutter 20 so that the hen cannot be bothered so long as she wills to remain on the nest. Whenever the hen desires to leave the nest, it is clear that she will be attracted by the light admitted into the nest only through the screened opening 30 at the front thereof and she will naturally seek the screened opening 30 as an exit. Hence she will hop upon the elevator 22 and her weight will overbalance the weight of the shutter 20 and the elevator 22 will descend so as to raise the shutter 20 and open the entrance-way C or exit. As the shutter 20 is raised, it will again be caught by the latch 26 and the nest will remain open so that the hen may return or another hen enter the nest whenever desired.

From the foregoing description, in connection with the accompanying drawings, it will be seen that I have provided a very simple and efficient construction of nest in which the action of the hen passing into the nest will effect the closing of the entrance-way behind her so that she cannot be bothered until she desires to leave the nest, at which time, the natural tendency of the hen, followed by her hopping upon the trap board 13 and stepping upon the elevator 22 will effect the automatic opening of the nest so that ready egress may be had.

Having thus described the invention, what is claimed as new is:

1. A nesting box of the character described, provided with a nesting compartment, an entrance compartment, said box having an opening leading into the entrance compartment, a trap board between said compartments, a shutter movable over the entrance compartment, an elevator mounted in the entrance compartment, a connection between said shutter and elevator for effecting the raising of the elevator upon the closing of the shutter and the opening of the shutter upon the lowering of the elevator, means for holding the shutter in open position, a connection between said shutter holding means and the trap board constituting means for effecting the release of the holding means from the shutter upon the movement of the trap board.

2. A nesting box of the character described, provided with a nesting compartment, an entrance compartment, said box having an opening leading into the entrance compartment, a vertically slidable shutter mounted in the box and adapted to fall to close said opening, an elevator movable vertically in the entrance compartment and having a connection with the shutter, said shutter constituting means for raising the elevator upon the downward movement of the shutter, the shutter normally outweighing the elevator, means for locking the shutter in open position, a vertically movable trap board mounted in the box between the two compartments, and a connection between said trap board and locking means constituting means for unlocking the shutter upon the depression of said trap board.

3. A nesting box of the character described, provided with a nesting compartment and an entrance compartment and a partition between the two, the box being also provided with an opening leading into the entrance compartment, a vertically slidable trap board mounted in the box above the partition, a shutter mounted in the box and movable over the entrance opening whereby to control the passage into the entrance compartment, an elevator mounted to move in the entrance compartment, a connection between the elevator and shutter providing means for raising the elevator upon the lowering of the latter and the raising of the shutter upon the lowering of the elevator, a latch with which the shutter is engaged upon the movement of the shutter to open position, the shutter normally outweighing the elevator, and a flexible connection between the latch and the trap board, as and for the purpose set forth.

4. A nesting box of the character described, provided with a nesting compartment, an entrance compartment, a partition between said compartments, a vertically slidable trap board mounted in the box above the partition and having a flexible connection therewith, a vertically slidable shutter controlling the entrance to the entrance compartment, an elevator mounted in the entrance compartment, a connection between the elevator and the shutter providing means for raising the elevator upon the lowering of the shutter, the shutter normally outweighing the elevator and weighted cables connected to the trap board, a roller over which said cables run, a latch with which the shutter is engaged upon the movement of the shutter to open position, and a release cable connected to said latch and roller as and for the purpose set forth.

5. A nesting box of the character described, provided with an entrance compartment, a nesting compartment, and an opening leading into the entrance compartment, a shutter movable over said entrance opening to close the same, a vertically movable elevator mounted in the entrance compartment, a vertically movable trap board mounted in the box between the nesting compartment and the entrance compartment, rollers mounted in the box above the shutter and the elevator, cables connected to said shutter and said elevator and passing over said rollers, weighted cables connected to said trap board, a roller over which said cables pass, a latch mounted in the box and with which the shutter is engaged upon the movement of the shutter to open position, a release cable connected to said latch, and a roller back of the latch and around which said release cable extends, said release cable being connected also to the roller over which the weighted cables pass, as and for the purpose set forth.

In testimony whereof I affix my signature in presence of two witnesses.

EDWARD C. SMITH. [L. S.]

Witnesses:
   T. C. WISE,
   T. H. SPEARS.